United States Patent
Kawaki et al.

(10) Patent No.: US 11,239,673 B2
(45) Date of Patent: Feb. 1, 2022

(54) CHARGING HOLDER FOR ELECTRONIC DEVICES THAT CONTAINS A ROTATION BLOCK AND A POCKET

(71) Applicant: Icom Incorporated, Osaka (JP)

(72) Inventors: Ken Kawaki, Osaka (JP); Haruki Nishizawa, Osaka (JP)

(73) Assignee: Icom Incorporated, Osaka (JP)

( * ) Notice: Subject to any disclaimer, the term of this patent is extended or adjusted under 35 U.S.C. 154(b) by 22 days.

(21) Appl. No.: 16/833,026

(22) Filed: Mar. 27, 2020

(65) Prior Publication Data

US 2021/0119457 A1    Apr. 22, 2021

(30) Foreign Application Priority Data

Oct. 18, 2019    (JP) .............................. JP2019-190752

(51) Int. Cl.
| | | |
|---|---|---|
| *H01M 10/46* | (2006.01) | |
| *H02J 7/00* | (2006.01) | |
| *B60R 11/02* | (2006.01) | |

(52) U.S. Cl.
CPC ........ *H02J 7/0044* (2013.01); *B60R 11/0241* (2013.01); *H02J 7/0045* (2013.01)

(58) Field of Classification Search
CPC ...... H02J 7/0044; H02J 7/0045; H02J 7/0042; B60R 2011/0085; B60R 2011/0075
USPC ................. D13/107, 108; 320/107, 114, 115
See application file for complete search history.

(56) References Cited

U.S. PATENT DOCUMENTS

| | | | | |
|---|---|---|---|---|
| 2009/0278490 A1* | 11/2009 | Idzik | ..................... | H02J 7/0044 320/103 |
| 2009/0284216 A1* | 11/2009 | Bessa | ..................... | H02J 7/0044 320/101 |
| 2011/0156637 A1* | 6/2011 | Thorsell | .................. | B60R 11/02 320/108 |
| 2013/0093220 A1* | 4/2013 | Pajic | ..................... | G06F 1/1632 297/163 |
| 2018/0138683 A1* | 5/2018 | Girdzis | ..................... | H02J 7/00 |

FOREIGN PATENT DOCUMENTS

JP             5197470 B2      5/2013

* cited by examiner

*Primary Examiner* — Edward Tso
(74) *Attorney, Agent, or Firm* — Leason Ellis LLP

(57) ABSTRACT

A charging holder for electronic devices is shared for a plurality of electronic devices having different thickness, and is stably fixed even under vibration conditions. The holder has a holder body, a rotation block and a lock unit. A pocket for inserting an electronic device is formed in the holder body. The rotation block is rotated and biased so that a tip portion can protrude inside the pocket, and has a contact terminal which can contact a charging terminal of the electronic device. The lock unit is for locking the upper side of the electronic device to the holder body when the electronic device is pushed into the pocket and rotated. The rotation block is configured so that the lower part of the electronic device can be inserted therein, holds the lower part of the electronic device regardless of the thickness of the electronic device.

15 Claims, 8 Drawing Sheets

CHARGING HOLDER FOR ELECTRONIC DEVICES THAT CONTAINS A ROTATION BLOCK AND A POCKET

This application claims the benefit of priority to Japanese Patent Application No. 2019-190752 filed on Oct. 18, 2019, the content of which is incorporated herein by reference.

BACKGROUND OF THE INVENTION

The present invention relates to a charging holder for electronic devices.

As a charging holder for electronic devices having different dimensions, a plurality of holder has been proposed in which the same charging holder can be shared without preparing accessory parts (see, for example, Japanese Patent No. 5197470).

In this charging holder, when the electronic devices are inserted into a pocket formed on an upper side of the holder body, a positioning member protruding inside the pocket applies a pressing force to the electronic device in a plurality of directions, then a charging terminal of the electronic device comes into contact with a contact terminal installed so as to protrude inside the pocket. According to this structure, the electronic device of various dimensions can be positioned so that the charging terminal of the electronic device contacts the contact terminal inside the pocket.

SUMMARY OF THE INVENTION

However, in such a charging holder for electronic devices, the state when the electronic device is inserted into the pocket of the charging holder is only the lower part of the electronic device is placed on the charging holder. For this reason, although it can be used for desktop use, when it is used for in-vehicle vibration, the electronic device is easily detached from the charging holder and is not suitable for in-vehicle use. It is also not suitable for wall hanging. Thus, when it is set for in-vehicle use or wall-mounting, particularly when the electronic device is a wireless device or the like, it is desired to be able to attach and lock the electronic device to the charging holder and remove it with one touch of one hand operation.

It is an object of the present invention to provide a charging holder for electronic devices suitable for automotive use, in which the holder can be shared with a plurality of electronic devices having different thickness dimensions, and can be stably and reliably fixed to a charging holder even under vibration conditions with a single touch.

The present invention is a charging holder for electronic devices with a charging terminal exposed at a lower back, comprising:
  a holder body in which a pocket for inserting the electronic device is formed,
  a rotation block having a contact terminal capable of contacting the charging terminal and being urged to rotate with respect to the holder body so that a tip portion of the rotation block projects into the pocket, and
  a lock unit for locking the upper side of the electronic device to the holder body when the electronic device is pushed into the pocket and rotated, wherein
  the rotation block is configured to be able to insert a lower part of the electronic device, and holds the lower part of the electronic device,
  the lock unit locks the upper side of the electronic device by rotating the electronic device held by the rotation block.

In the holder, a rotation angle of the rotation block in the locked state of the electronic device may have different angles corresponding to the thickness of the battery pack mounted on the electronic device.

According to this configuration, the electronic device can be locked regardless of the thickness of the battery pack.

In the holder, a slide recess may be provided at a predetermined height position in the thickness direction from the back surface on the side surface of the electronic device, the rotation block has a slide protrusion for guiding the electronic device when the electronic device is inserted, and holds the electronic device by engaging a slide recess of the electronic device with the slide protrusion, the lock unit is configured by a support column having a hook with a slanting surface at the upper end, and the support column is elastically biased in a standing posture with respect to the holder body, when the electronic device held by the rotation block is rotated, the lock unit locks the electronic device when the upper part of the electronic device gets over the hook against the elastic bias of the support column.

According to this configuration, a lower part of the electronic device can be reliably positioned and held to the rotation block, and the electronic device can be reliably locked to the holder body by rotating the electronic device in the holding state. In the above, the rotation block has the slide protrusion and the electronic device has the slide recess, but the electronic device may have a slide protrusion and the rotation block may have a slide recess.

In the holder, the support column constituting the lock unit may comprise; a resin member having the hook rotatably held with respect to the holder body, and a metal plate fixed to the holder body and elastically urging the resin member in a standing posture from the back side.

According to this configuration, the lock portion is stronger and more resilient than the resin member, and the electronic device can be securely locked to the holder body. The electronic equipment is not damaged when it gets over and locked. The metal plate may be inserted into the resin member.

In the holder, the rotation block may comprise; a spring for urging the rotation block to rotate relative to the holder body, and a contact terminal board having the contact terminal, the charging holder comprises; a charging circuit board disposed inside the holder body, and a socket which is connected to the tip of a lead wire led out from the charging circuit board, wherein the socket is attached to a connector terminal provided on the contact terminal board, a middle part of the lead wire is hold to a protrusion for fixing the end of the spring provided in the rotation block.

According to this configuration, when the rotation block is rotated, the lead wire and the socket on the rotation block side only rotate and swing integrally with the rotation block, so that the socket can be prevented detaching from the connector terminal. Further, since the end fixing of the spring also serves as holding of the middle part of the lead wire, the number of parts and the number of work steps can be reduced.

In the holder, the holder body may have a space for removing the electronic device from the holder body on the upper back side of the electronic device locked by the lock unit.

According to this configuration, a finger can be put into the space, and the electronic device fixed to the holder body can be easily detached from the charging holder by one-touch operation, particularly when the charging holder is in-vehicle.

According to the present invention, the holder can be shared for multiple electronic devices with different thickness dimensions, and the electronic devices can be fixed to the charging holder with a single touch stably and reliably even under vibration conditions. It is suitable for automotive use.

DETAILED DESCRIPTION OF THE INVENTION

A charging holder for electronic devices (hereinafter referred to as a charging holder) according to an embodiment of the present invention will be described with reference to the drawings. The charging holder of this embodiment is for charging a battery by setting various devices such as a wireless device, a mobile phone etc. to which the battery or battery pack is mounted. In the present embodiment, an example which a wireless device is used as the electronic device will be described. As shown in the perspective view of FIG. 1, the diagonally lower left is referred to as the front, the diagonally upper right as the rear, the diagonally lower right as the right, and the diagonally upper left as the left.

(Structure of Charging Holder)

Figure 1:
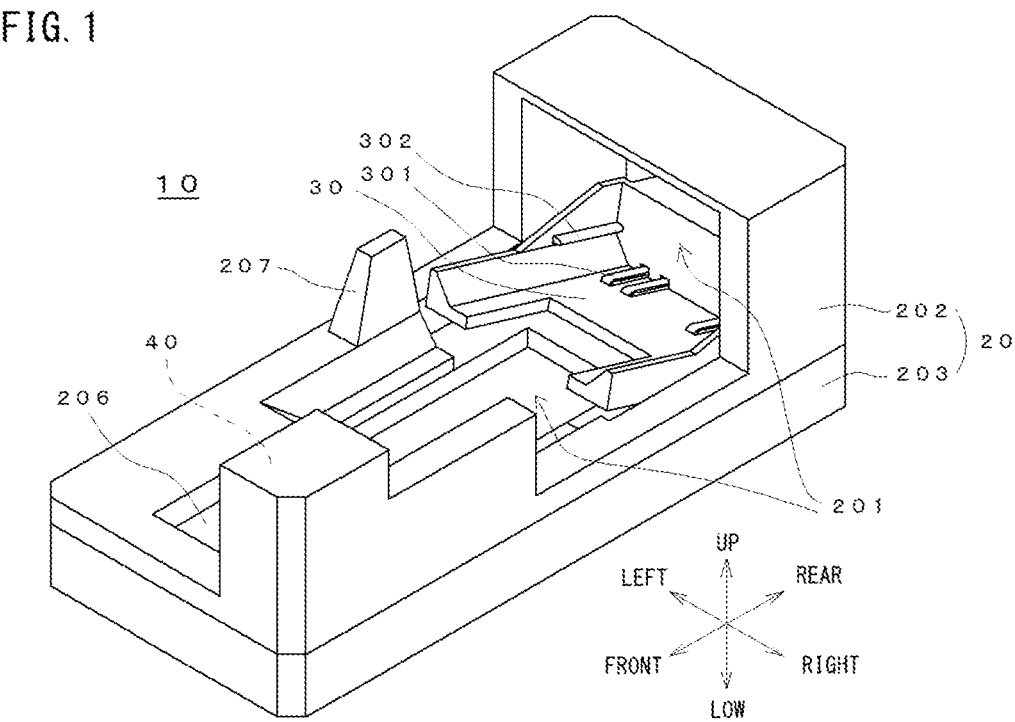
FIG. 1 is a perspective view from the right side of a charging holder for electronic devices according to an embodiment of the present invention.
Figure 2:
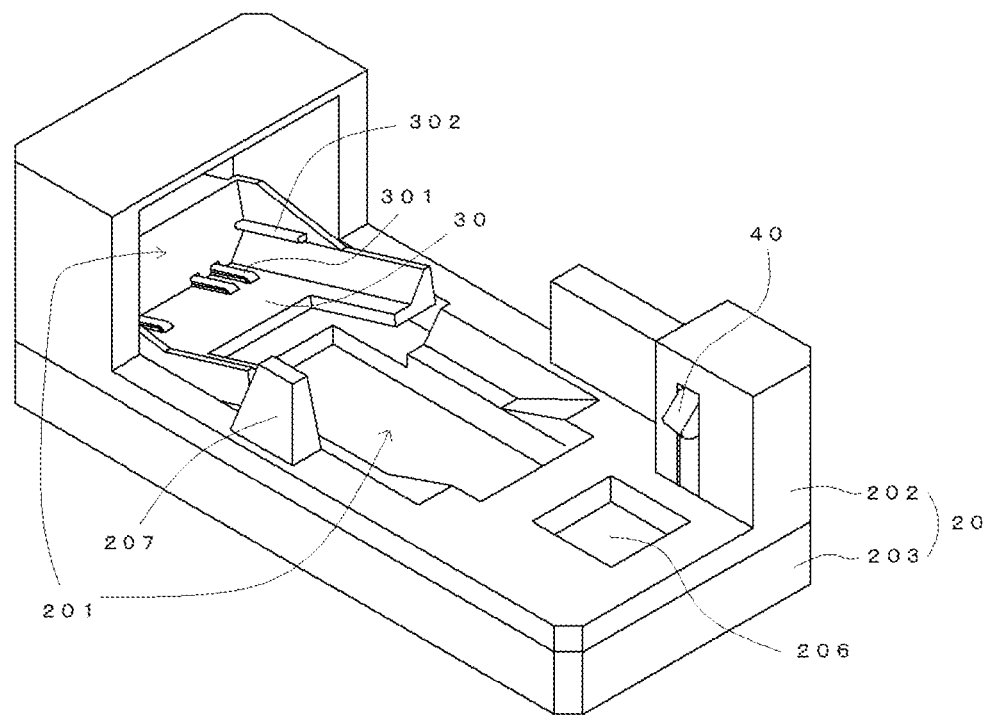
FIG. 2 is a perspective view from the left of the charging holder.

FIGS. 1 and 2 show a charging holder 10 according to the present embodiment.

The charging holder 10 includes a holder body 20 having a pocket 201 formed on the upper surface for inserting an electronic device. The holder body 20 includes a rotation block 30 and a lock unit 40 for positioning and fixing the electronic device inserted into the pocket 201 to the holder body 20. The rotation block 30 has a contact terminal 301 that can contact a charging terminal of an electronic device inserted into the pocket 201. Further, the rotation block 30 is urged to rotate so that a tip portion 306 (FIG. 6A, 6B) thereof can protrude into the pocket 201. The lock unit 40 fixes the upper side of the electronic device to the holder body 20 when the electronic device is pushed into the pocket 201 and rotated.

The rotation block 30 is configured such that the lower part of the electronic device can be inserted, and holds the lower part of the electronic device regardless of the thickness of the battery pack of the electronic device. Here, the rotation block 30 is rotating ally biased so that the tip end portion thereof is inclined obliquely upward so as to be easily inserted when the electronic device is inserted into the pocket 201. When the lower part of the electronic device is inserted into the rotation block 30, the charging terminal of the electronic device is electrically connected to the contact terminal 301. The lock unit 40 causes the upper side of the electronic device to be in a locked state by rotating the electronic device together with the rotation block 30 in a state where the lower portion of the electronic device is held on the rotation block 30.

In this example, the holder body 20 is formed of a resin molded product. The holder body 20 includes a charging circuit board 210 (see FIG. 9) and the like. The holder body 20 includes a case 202 having an open bottom surface and a lid 203 that closes the open surface. A power input terminal 205 (see FIG. 9) into which an output plug of the charging adapter is inserted is disposed on the rear surface of the holder body 20. The case 202 forms a pocket 201 and is configured to surround the rear, side, and upper side of the rotation block 30, and the inside of the case 202 is hollow.

The lock unit 40 is provided at a position away from the rotation block 30 on one side around the pocket 201 of the case 202. In addition, a protruding member 207 is provided at a position diagonal to the position where the lock unit 40 is provided for positioning the electronic device inserted into the pocket 201. As described above, the lock unit 40 and the protruding member 207 are arranged in a diagonal position, which is effective for positioning when the electronic device is inserted into the pocket 201.

Figure 3A:
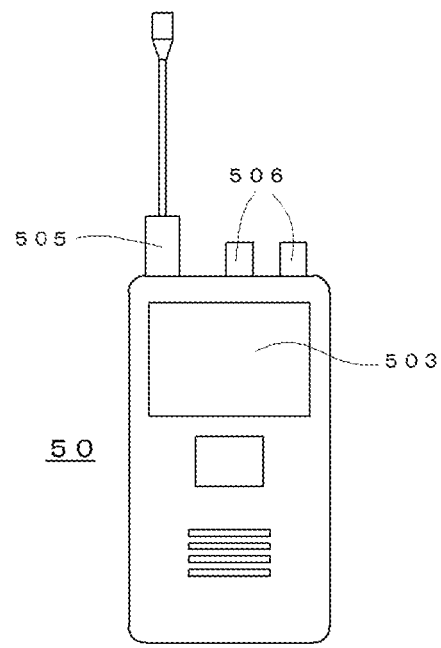
FIG. 3A is a front view of an electronic device attached to the charging holder.
Figure 3B:
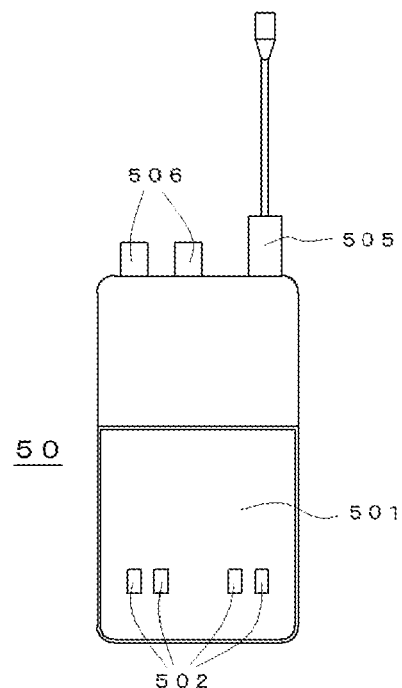
FIG. 3B is a rear view of the electronic device.

FIGS. 3A and 3B show the configuration of the electronic device 50. In the electronic device 50, a battery pack 501 is mounted on the lower back of the electronic device 50 with the charging terminal 502 exposed on the outer surface. The electronic device 50 includes a display unit 503, an operation unit 504, and the like on the front, and an antenna unit 505, an adjustment unit 506, and the like on the top.

Figure 4:
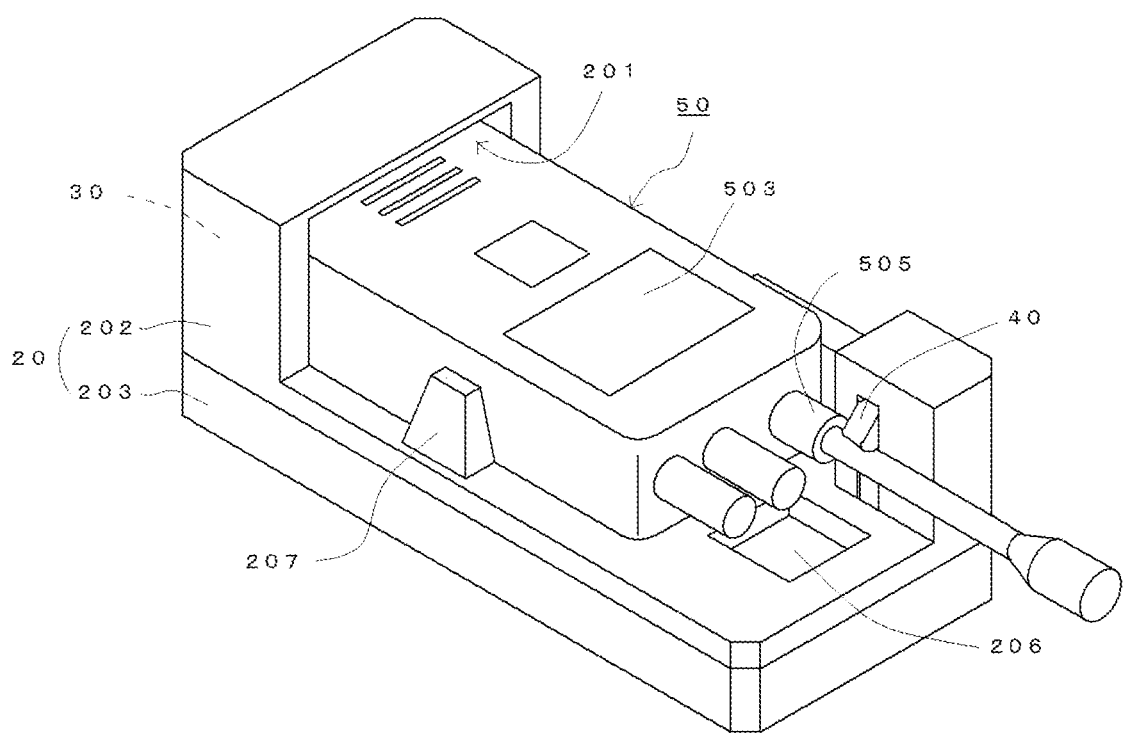
FIG. 4 is a perspective view of a state in which an electronic device is mounted on the charging holder shown in FIG. 2.

FIG. 4 shows a state where the electronic device 50 is mounted on the charging holder 10. The electronic device 50 is inserted and set in the pocket 201 of the holder body 20, and is locked (fixed) by the rotation block 30 and the lock unit 40. At this time, the electronic device 50 is being charged or is in a standby state. The holder body 20 has a space 206 for removing the electronic device 50 from the holder body 20 at a position corresponding to the upper back side of the electronic device 50 that is locked to the holder body 20. A finger can be put into the space 206 and the locked electronic device 50 can be easily detached from the charging holder 10 by one-touch operation with one hand.

Figure 5:
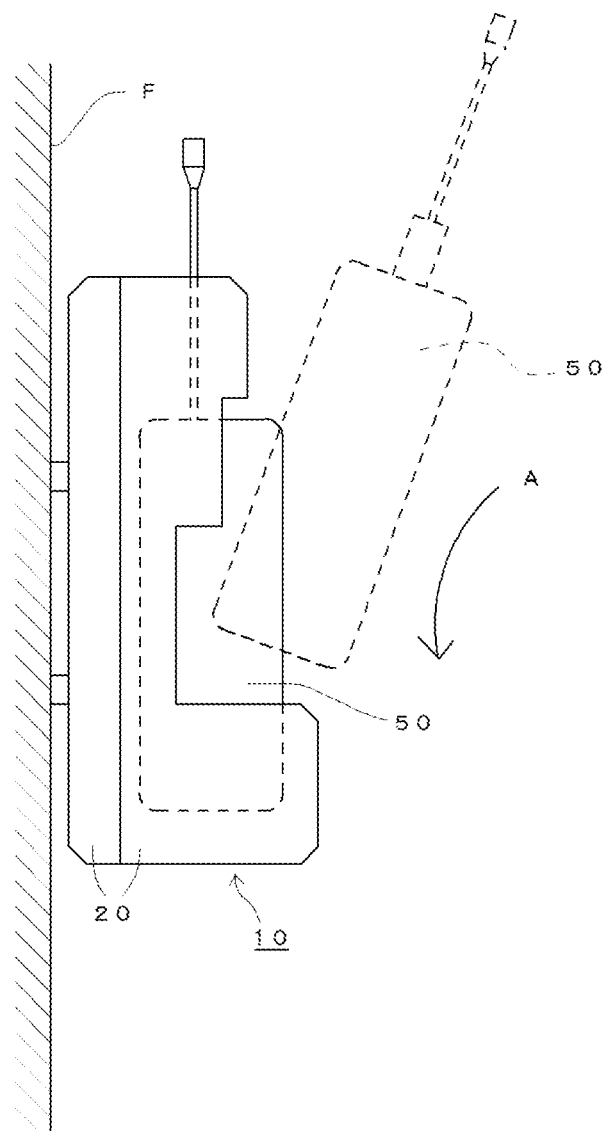
FIG. 5 is a side view showing a state in which the electronic device is mounted on the charging holder.

FIG. 5 shows a state in which the electronic device 50 is mounted on the charging holder 10. The charging holder 10 is fixed to a wall surface F of a vehicle or a building, for example, in actual use. The wall surface F may be an inclined surface or a horizontal surface in addition to a vertical surface. As shown by an arrow A, the electronic device 50 is attached to the charging holder 10 so that the lower portion of the electronic device 50 is obliquely inserted into the holder body 20. The lid 203 is provided with holes and screw holes for attaching the charging holder 10 to the wall surface F.

(Structure of Rotation Block)

Figure 6A:
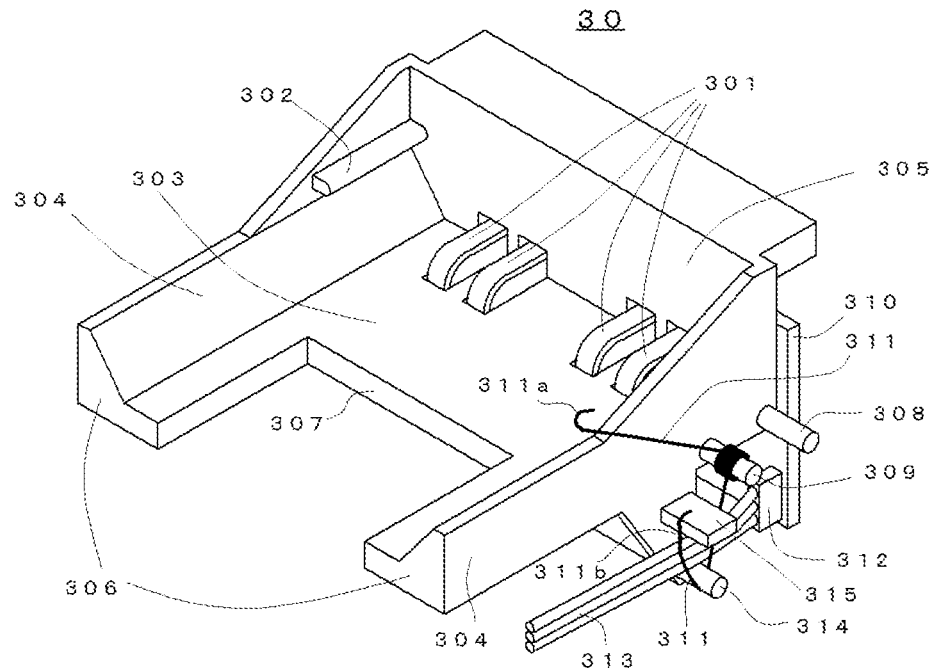
FIG. 6A is a perspective view from the front of the rotation block of the charging holder.
Figure 6B:
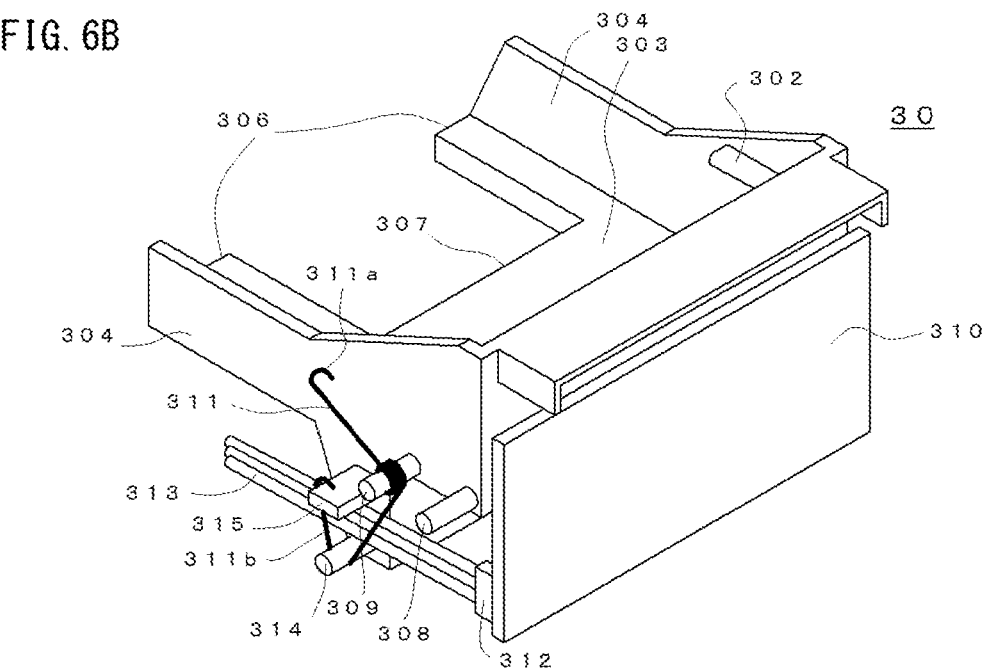
FIG. 6B is a perspective view from the rear.

FIG. 6A is a view of the rotation block 30 as viewed from the front, and FIG. 6B is a view as viewed from the rear. The rotation block 30 is rotatably provided on the holder body 20 and is configured to receive and hold the lower part of the electronic device 50 regardless of the thickness of the battery pack of the electronic device 50. For this purpose, the rotation block 30 has a slide protrusion 302 that guides the lower part of the electronic device 50. On the other hand, on the electronic device 50 side, a slide recess 510 (see FIG. 7) that engages with the slide protrusion 302 is provided.

The rotation block 30 includes a block body 303, side walls 304 on the left and right sides of the block body 303, a rear end wall 305, a notch 307 on the tip portion 306 side of the block body 303, a rotating shaft 308 provided on the outer surface of the side wall 304, and a spring shaft 309 for urging the rotating. The block body 303 is rotatably held by the holder body 20 and has a receiving surface that receives the back surface of the battery pack 501 of the electronic device 50. These can be integrally formed of a resin molded product. The rotating shaft 308 is supported by the bearing portion of the holder body 20. A slide protrusion 302 is provided on the opposing inner surface of the side walls 304.

The rotation block 30 includes a contact terminal board 310 having a contact terminal 301 made of a spring material, and a spring 311 made of a coil spring that urges the holder body 20 to rotate. The contact terminal board 310 is fixed to the block body 303 so that the contact terminals 301 protrude from the opening window of the block body 303 above the receiving surface. The contact terminal 301 applies a sufficient contact pressure to the charging terminal 502 of the electronic device 50. An intermediate coil portion of the spring 311 is supported by the spring shaft 309, a lower end 311*b* is fixed to the protrusion 314 and 315 of the block body 303, and an upper end 311*a* is in contact with the hollow inner wall of the case 202. The spring 311 urges the block body 303 to rotate about the rotating shaft 308 so that the tip portion 306 of the block body 303 is inclined upward in the natural state.

Figure 7A:
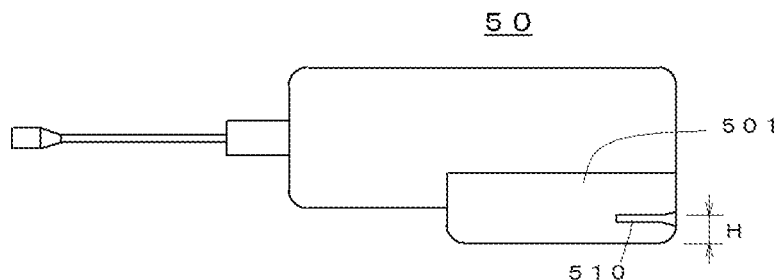
FIG. 7A is a side view when the thickness of the battery pack attached to the electronic device is large.
Figure 7B:
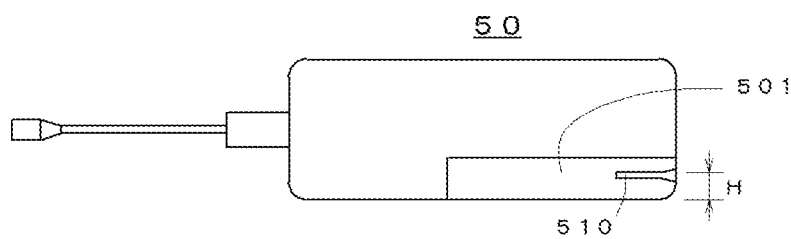
FIG. 7B is a side view when the thickness of the battery pack is small.

FIG. 7A shows the electronic device 50 having a large thickness of the battery pack 501 attached, and FIG. 7B shows the electronic device 50 having a small thickness of the battery pack 501. As shown in these drawings, a slide recess 510 is provided on the side surface of the battery pack 501 at a predetermined height (H) position in the thickness direction from the back surface. Regardless of the thickness of the battery pack 501, the slide recess 510 is provided at the same height (H) position from the back surface thereof.

By engaging the slide protrusion 302 of the rotation block 30 with the slide recess 510 of the battery pack 501, the lower portion of the electronic device 50 can be reliably positioned and held on the rotation block 30. At that time, the charging terminal 502 of the electronic device 50 is in pressure contact with and electrically connected to the contact terminal 301.

(Configuration of Lock Unit)

Figure 8:
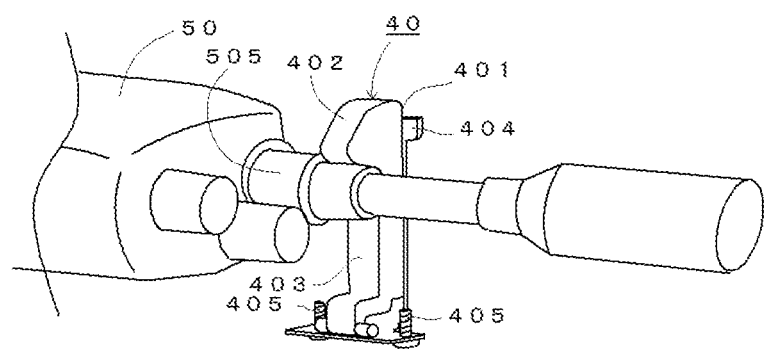
FIG. 8 is a main part perspective view showing a state in which the electronic device is mounted on the charging holder and locked by the lock unit.

FIG. 8 shows a configuration of a lock unit 40 that attaches and locks the electronic device 50 to the charging holder 10. The lock unit 40 is configured by a support column 401 that is elastically biased in a standing posture with respect to the holder body 20. The support column 401 has a hook 402 with an upward slope and a downward slope in a substantially triangular shape when viewed from the side surface at the upper end thereof. When the electronic device 50 is pushed down and rotated while the lower portion of the electronic device 50 is held by the rotation block 30, the upper portion of the electronic device 50 is brought into contact with the upward slope of the hook 402, and the support column 401 is elastically attached. When climbing over the hook 402 against the force, the upper portion of the electronic device 50 is locked by the downward slope of the hook 402.

The support column 401 includes a resin member 403 that is rotatably held with respect to the holder body 20 and has the hook 402, and a metal plate 404 that elastically urges the resin member 403 in a standing posture from the back side. The metal plate 404 is fixed to the case 202 with screws 405 at the legs bent in an L shape. The support column 401 faces the opening provided in the holder body 20, and the hook 402 and a part of the support column 401 protrude from the opening of the holder body 20 so as to be swingable. The metal plate 404 may be inserted into the resin member 403.

According to the lock unit 40 of the present embodiment, the electronic device 50 can be easily and reliably locked to the holder body 20 regardless of the thickness of the battery pack 501 of the electronic device 50. When the electronic device 50 in the locked state is removed from the charging holder 10, the electronic device 50 gets over the downward slope of the hook 402. In addition, the lock unit 40 is stronger and has a larger elastic biasing force than the case where the lock unit 40 is configured only by the resin member 403, and the electronic device 50 can be reliably locked to the holder body 20.

(Each Opening of the Case and Lid)

Figure 9:
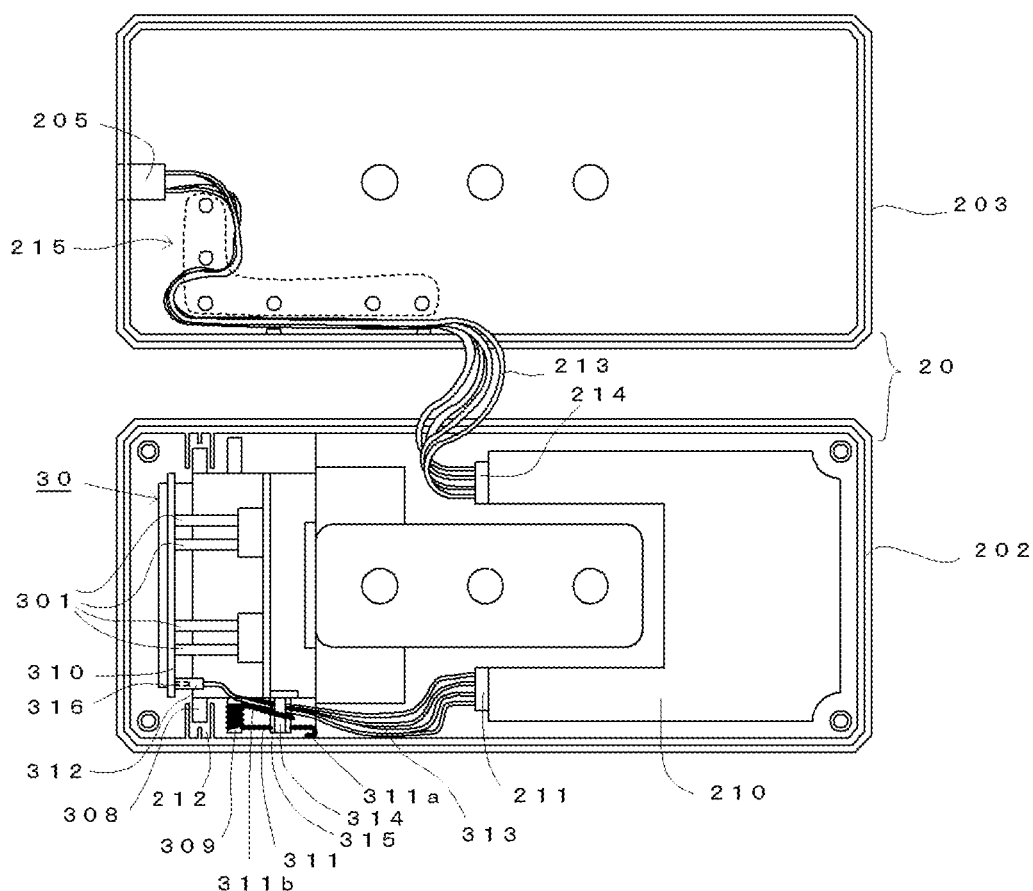
FIG. 9 is a plan view of the charging holder with the lid body removed and the case and the opening surfaces of the lid body facing upward.

FIG. 9 shows a state in which the lid 203 is removed from the case 202 and the opening surfaces of the case 202 and the lid 203 are directed upward. Inside the holder body 20, the rotation block 30, the charging circuit board 210, and the like are arranged. The lid 203 is provided with a power input terminal 205. The power input terminal 205 and the charging circuit board 210 are connected by a wire 213 such as a cable. The lid 203 side of the wire 213 is routed and held using a plurality of ribs 215 erected on the lid 203, and the case 202 side of the wire 213 is connected to the connector terminal of the charging circuit board 210 by a socket 214.

Here, description will be made with reference to FIG. 6. In FIG. 9, the rotation block 30 is upside down and the bottom side is visible. A socket 312 is attached to a connector terminal 316 of the contact terminal board 310 of the rotation block 30. The socket 312 is connected to the leading end of the lead wire 313 led out from the charging circuit board 210 disposed inside the holder body 20. The other end of the lead wire 313 is connected to a socket 211 attached to the connector terminal of the charging circuit board 210. The rotating shaft 308 of the rotation block 30 is inserted into the bearing portion 212 of the case 202 and is prevented from being detached by covering the case 202 with the lid 203.

The lead wire 313 is held at a middle part thereof by the protrusion 314 and 315 fixing the lower end 311*b* of the spring 311 of the rotation block 30 and the spring 311. With such a configuration, when the rotation block 30 is rotated, the lead wire 313 and the socket 312 only swing integrally with the rotation block 30, so that it is possible to prevent the socket 312 from being detached from the connector terminal of the contact terminal board 310. Moreover, since the structure which fixes the lower end 311*b* (end part) of the spring 311 serves also as the holding of the middle part of the lead wire 313, a number of parts and an operation man-hour can be reduced.

(Electronic Device Mounting Operation)

Figure 10A:
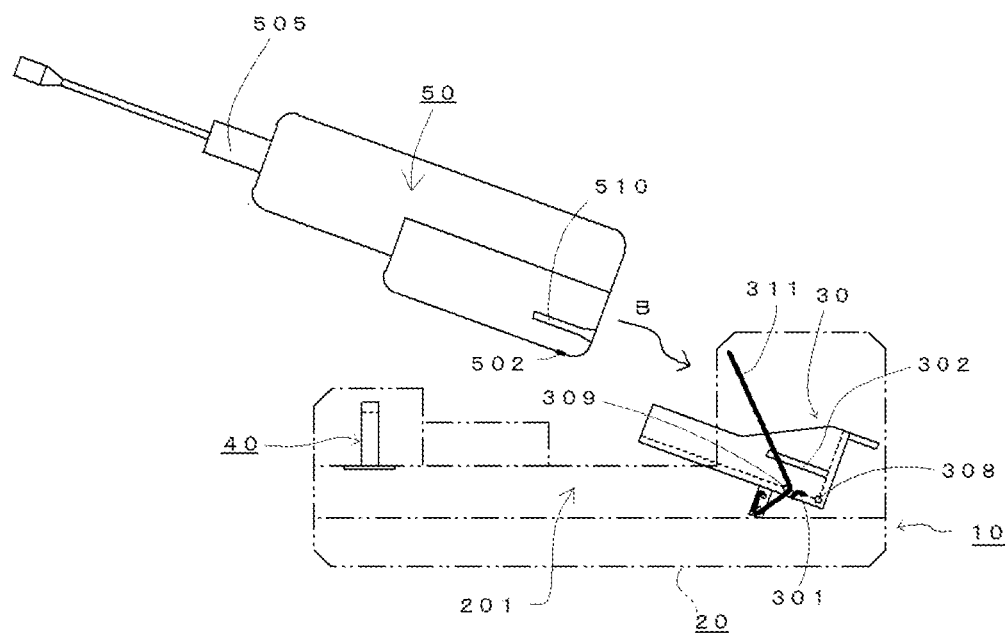
FIG. 10A is a schematic side view before mounting the electronic device having a thick battery pack on the charging holder.
Figure 10B:
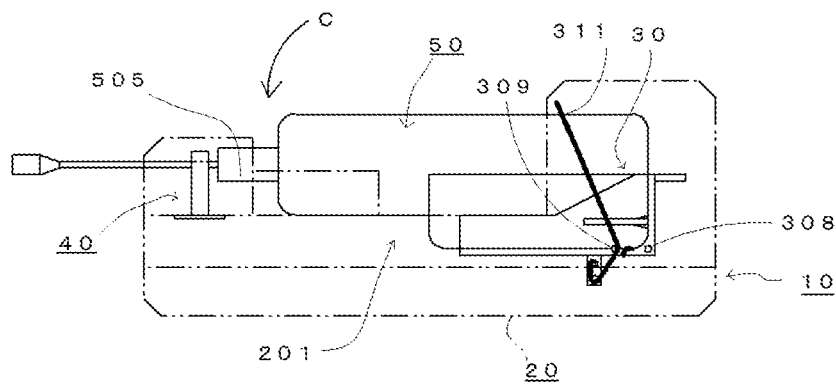
FIG. 10B is a schematic side view after mounting.
Figure 11A:
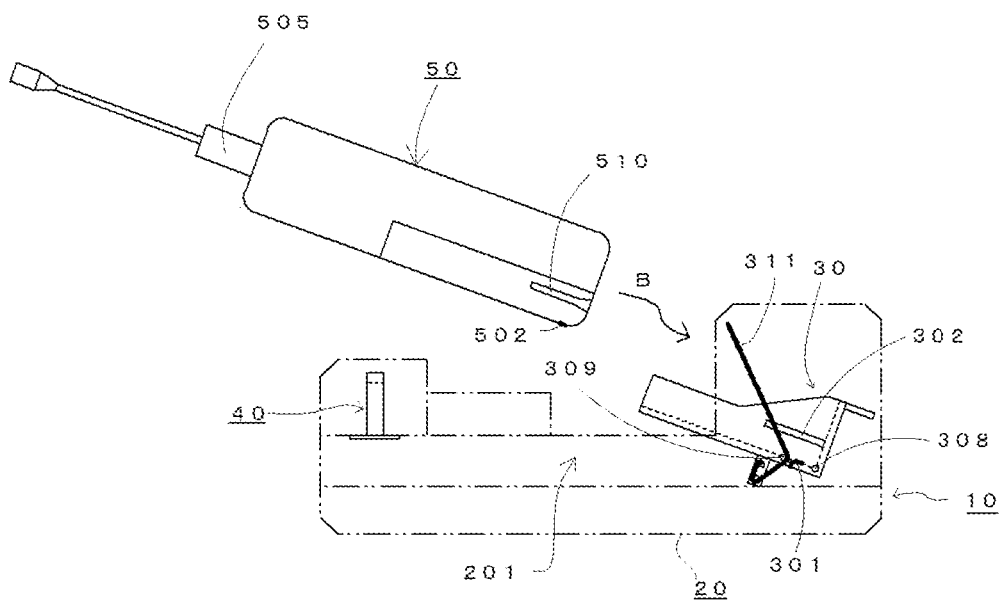
FIG. 11A is a schematic side view before mounting the electronic device having a battery pack with a small thickness on the charging holder.
Figure 11B:
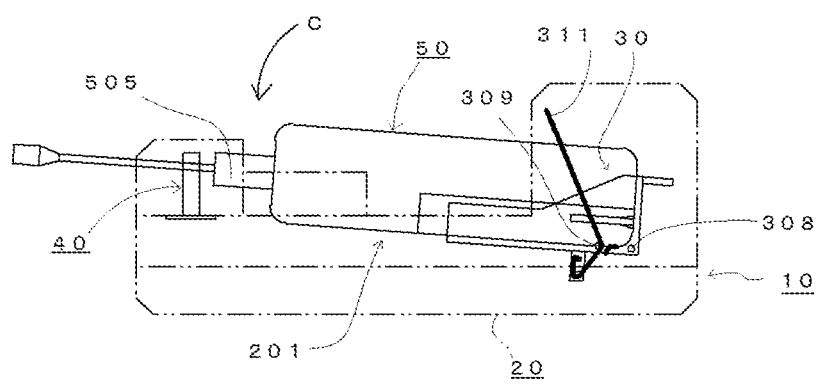
FIG. 11B is a schematic side view after mounting.

FIG. 10A shows a state before the electronic device 50 having the battery pack 501 with a large thickness is attached to the charging holder 10, and FIG. 10B shows a state after the attachment. FIG. 11A shows a state before the electronic device 50 having the battery pack 501 with a small thickness is attached to the charging holder 10, and FIG. 11B shows a state after the attachment. In these drawings, the holder body 20 is simplified by a two-dot chain line. As indicated by an arrow B, the electronic device 50 is attached to the rotation block 30 so that the lower portion is inserted obliquely into the pocket 201 of the holder body 20. At this time, the insertion operation is possible regardless of the thickness of the electronic device 50 side. Further, the rotation block 30 is in a state where the tip portion 306 of the rotation block 30 is inclined upward by the spring 311 in a natural state, and can be easily inserted. By this insertion operation, the slide protrusion 302 of the rotation block 30 and the slide recess 510 on the electronic device 50 side are engaged, and the contact terminal 301 of the rotation block 30 and the charging terminal 502 of the electronic device 50 are contact with a predetermined contact pressure.

Next, as shown by an arrow C, when the electronic device 50 is pushed down, the electronic device 50 rotates together with the rotation block 30 against the rotating biasing force of the spring 311 (the spring is opened). The upper portion, that is, in this example, the side of the mounting portion of the antenna unit 505 is over the hook 402 of the lock unit 40 and locked. Here, in the mounted state of the electronic device 50 having the battery pack with a large thickness, the electronic device 50 is locked in a substantially parallel posture in the front-rear direction of the charging holder 10 as shown in FIG. 10B. On the other hand, in the mounted state of the electronic device 50 having the battery pack with a small thickness, as shown in FIG. 11B, the electronic device 50 is locked in an oblique posture in which the upper portion thereof is raised. As described above, the rotation angle of the rotation block 30 in the locked state of the electronic device 50 varies depending on the thickness of the battery pack of the electronic device 50. Thus, even if the lock posture differs depending on the thickness of the battery pack, the lock unit 40 is configured to be able to cope with it.

Thus, the electronic device 50 can be reliably fixed to the charging holder 10 regardless of the thickness of the electronic device 50 side. Even if the electronic device 50 is equipped with a belt clip for body wearing on the back side, the pocket 201 of the holder body 20 is shaped so as not to interfere with the belt clip.

As described above, according to the charging holder 10 for electronic devices of the present embodiment, the same charging holder can be shared for a plurality of electronic devices 50 having different thickness dimensions. And for example, for in-vehicle use, even under severe vibration conditions as in the case, the electronic device 50 can be fixed to the charging holder stably and surely with one touch.

The present invention is not limited to the configuration of the above embodiment, and various modifications can be made. For example, in the above description, the case where the thickness of the battery pack 501 of the electronic device 50 is large or small has been described, but the present invention can be similarly applied even when the thickness of the electronic device 50 itself formed by exposing the charging terminal is large or small. The slide protrusion 302 and the slide recess 510 can adopt any configuration as long as they can be engaged with each other. The electronic device 50 or the battery pack 501 may have a slide protrusion, and the rotation block 30 may have a slide recess, and such a configuration is also included in the technical scope.

EXPLANATION OF SYMBOLS

10 charging holder
20 holder body
201 pocket
202 case
203 lid
205 power input terminal
206 space
207 protruding member
210 charging circuit board
211 socket
212 bearing portion
213 wire
214 socket
215 ribs
30 rotation block
301 contact terminal
302 slide protrusion
303 block body
304 side walls
305 rear end wall
306 tip portion
307 notch
308 rotating shaft
309 spring shaft
310 contact terminal board
311 spring
311a upper end
311b lower end
312 socket
313 lead wire
314 protrusion
315 protrusion
316 connector terminal
40 lock unit
401 support column
402 hook
403 resin member
404 metal plate
405 screws
50 electronic device
501 battery pack
502 charging terminal
503 display unit
504 operation unit
505 antenna unit
506 adjustment unit
510 slide recess
F wall surface

The invention claimed is:

1. A charging holder for an electronic device with a charging terminal exposed at a lower back, comprising:
   a holder body in which a pocket for inserting the electronic device is formed,
   a rotation block having a contact terminal capable of contacting the charging terminal and being urged to rotate with respect to the holder body so that a tip portion of the rotation block projects into the pocket, and a lock unit for locking an upper side of the electronic device to the holder body when the electronic device is pushed into the pocket and rotated, wherein the rotation block is configured to receive and hold a lower part of the electronic device, the lock unit locks the upper side of the electronic device by rotating the electronic device held by the rotation block, the charging holder can be shared by a plurality of electronic devices having different thickness dimensions, and a rotation angle of the rotation block in a locked state of the electronic device varies corresponding to a thickness of the electronic device.

2. The charging holder for the electronic device in accordance with claim 1, wherein a slide recess is provided on a side surface of the electronic device at a predetermined height position in the thickness direction from a back surface of the electronic device, and the rotation block has a slide protrusion for guiding the electronic device when the electronic device is inserted, and holds the electronic device by engaging the slide recess of the electronic device with the slide protrusion.

3. The charging holder for the electronic device in accordance with claim 1, wherein the rotation block comprises;
a spring for urging the rotation block to rotate relative to the holder body, and
a contact terminal board having the contact terminal, the charging holder comprises;
a charging circuit board disposed inside the holder body, and
a socket which is connected to a tip of a lead wire led out from the charging circuit board, the socket being attached to the connector terminal provided on the contact terminal board, and a middle part of the lead wire is held to a protrusion for fixing an end of the spring provided in the rotation block.

4. The charging holder for the electronic device in accordance with claim 1, wherein the holder body has a space for removing the electronic device from the holder body, said space being formed on an upper back side of the electronic device locked by the lock unit.

5. The charging holder for the electronic device in accordance with claim 1, wherein the lock unit comprises a support column having a hook with a slope at the upper end, and the support column being elastically urged in a standing posture with respect to the holder body, when the electronic device held by the rotation block is rotated, an upper part of the electronic device climbs over the hook against an elastically urged force from the support column so that the electronic device is locked by the lock unit.

6. The charging holder for the electronic device in accordance with claim 5, wherein the support column comprises;
a resin member having the hook rotatably held with respect to the holder body, and
a metal plate fixed to the holder body and elastically urging the resin member in a standing posture from a back side of the support column.

7. A charging holder for an electronic device with a charging terminal exposed at a lower back, comprising:

a holder body in which a pocket for inserting the electronic device is formed, a rotation block having a contact terminal capable of contacting the charging terminal and being urged to rotate with respect to the holder body so that a tip portion of the rotation block projects into the pocket, and a lock unit for locking an upper side of the electronic device to the holder body when the electronic device is pushed into the pocket and rotated, wherein the rotation block is configured to receive and hold a lower part of the electronic device, the lock unit locks the upper side of the electronic device by pushing down and rotating the electronic device held by the rotation block against a rotating biasing force, the charging holder can be shared by a plurality of electronic devices having different thickness dimensions.

8. The charging holder for the electronic device in accordance with claim 7, wherein a rotation angle of the rotation block in a locked state of the electronic device varies corresponding to a thickness of the electronic device.

9. The charging holder for the electronic device in accordance with claim 7, wherein a slide recess is provided on a side surface of the electronic device at a predetermined height position in the thickness direction from a back surface of the electronic device, and the rotation block has a slide protrusion for guiding the electronic device when the electronic device is inserted, and holds the electronic device by engaging the slide recess of the electronic device with the slide protrusion.

10. The charging holder for the electronic device in accordance with claim 7, wherein the rotation block comprises;
a spring for urging the rotation block to rotate relative to the holder body, and
a contact terminal board having the contact terminal, the charging holder comprises;
a charging circuit board disposed inside the holder body, and
a socket which is connected to a tip of a lead wire led out from the charging circuit board, the socket being attached to the connector terminal provided on the contact terminal board, and a middle part of the lead wire is held to a protrusion for fixing an end of the spring provided in the rotation block.

11. The charging holder for the electronic device in accordance with claim 7, wherein the holder body has a space that allows for removing the electronic device from the holder body, said space being formed on an upper back side of the electronic device locked by the lock unit.

12. The charging holder for the electronic device in accordance with claim 7, wherein the lock unit comprises a support column having a hook with a slope at the upper end, and the support column being elastically urged in a standing posture with respect to the holder body, when the electronic device held by the rotation block is rotated, an upper part of the electronic device climbs over the hook against an elastically urged force from the support column so that the electronic device is locked by the lock unit.

13. The charging holder for the electronic device in accordance with claim 12, wherein the support column comprises;
- a resin member having the hook rotatably held with respect to the holder body, and
- a metal plate fixed to the holder body and elastically urging the resin member in a standing posture from a back side of the support column.

14. A charging holder for an electronic device with a charging terminal exposed at a lower back, comprising:
- a holder body in which a pocket for inserting the electronic device is formed,
- a rotation block having a contact terminal capable of contacting the charging terminal and being urged to rotate with respect to the holder body so that a tip portion of the rotation block projects into the pocket, and
- a lock unit for locking an upper side of the electronic device to the holder body when the electronic device is pushed into the pocket and rotated, wherein
- the rotation block is configured to receive and hold a lower part of the electronic device,
- the lock unit locks the upper side of the electronic device by rotating the electronic device held by the rotation block,
- the charging holder can be shared by a plurality of electronic devices having different thickness dimensions,
- a slide recess is provided on a side surface of the electronic device at a predetermined height position in the thickness direction from a back surface of the electronic device,
- the rotation block has a slide protrusion for guiding the electronic device when the electronic device is inserted, and holds the electronic device by engaging the slide recess of the electronic device with the slide protrusion,
- the lock unit comprises a support column having a hook with a slope at the upper end, and the support column being elastically urged in a standing posture with respect to the holder body,
- when the electronic device held by the rotation block is rotated, an upper part of the electronic device climbs over the hook against an elastically urged force from the support column so that the electronic device is locked by the lock unit.

15. The charging holder for the electronic device in accordance with claim 14, wherein the support column comprises;
- a resin member having the hook rotatably held with respect to the holder body, and
- a metal plate fixed to the holder body and elastically urging the resin member in a standing posture from a back side of the support column.

* * * * *